(12) United States Patent
Durina

(10) Patent No.: US 12,151,416 B2
(45) Date of Patent: Nov. 26, 2024

(54) PLASTICATING AND INJECTION MOLDING SYSTEM

(71) Applicant: Michael Durina, Poland, OH (US)

(72) Inventor: Michael Durina, Poland, OH (US)

( * ) Notice: Subject to any disclaimer, the term of this patent is extended or adjusted under 35 U.S.C. 154(b) by 236 days.

(21) Appl. No.: 17/588,921

(22) Filed: Jan. 31, 2022

(65) Prior Publication Data

US 2023/0241822 A1 Aug. 3, 2023

(51) Int. Cl.
*B29C 45/62* (2006.01)
*B29C 45/47* (2006.01)
*B29C 45/58* (2006.01)

(52) U.S. Cl.
CPC ............ *B29C 45/586* (2013.01); *B29C 45/47* (2013.01); *B29C 45/62* (2013.01)

(58) Field of Classification Search
CPC ....................................................... B29C 45/62
See application file for complete search history.

(56) References Cited

U.S. PATENT DOCUMENTS

| | | | |
|---|---|---|---|
| 2,629,132 A | | 2/1953 | Willcox et al. |
| 2,734,226 A | | 2/1956 | Willert |
| 2,885,734 A | | 5/1959 | Wucher |
| 3,002,229 A | | 10/1961 | Friederich |
| 3,020,591 A | * | 2/1962 | Breher .................. B29C 45/532 |
| | | | 425/565 |
| 4,722,679 A | | 2/1988 | Farrell |
| 5,112,213 A | | 5/1992 | Oas |
| 5,246,660 A | * | 9/1993 | Tsutsumi ................ B29C 45/52 |
| | | | 366/82 |
| 2016/0158980 A1 | * | 6/2016 | Fitzpatrick .............. B29C 45/18 |
| | | | 264/328.15 |
| 2018/0050475 A1 | * | 2/2018 | Kara ...................... B29C 45/261 |
| 2018/0281250 A1 | * | 10/2018 | Maguire ............. B29C 45/1635 |

* cited by examiner

*Primary Examiner* — Alison L Hindenlang
*Assistant Examiner* — Debjani Roy
(74) *Attorney, Agent, or Firm* — Harpman & Harpman

(57) ABSTRACT

An injection molding apparatus that employs a stationary plasticating screw relative to feed port, non-reciprocal helical plasticating screw housed within an inner barrel that is coupled to a plunger head assembly, drive housing, motor and injection cylinders that is housed within an outer barrel/pressure vessel that conveys, melts, homogenizes and pumps polymeric plastic material precisely and efficiently along One axis. The helical plasticating screw is fixed in relative position within the inner barrel so that the material feed opening of the inner barrel and helical plasticating screw are aligned to accept pellets, powder or liquid of polymetric substance. The inner barrel is fixed to a plunger head assembly on the distal end that is housed within a pressure vessel with close proximity between the outside diameter of the plunger head and the inside diameter of said pressure vessel that upon screw rotation transfers polymetric material through the center passageway of said plunger head opening a normally closed one-way shut-off mechanism into said pressure vessel precisely for future displacement of polymeric mass into a mold or other. The apparatus and process of feeding, melting and injecting Polymeric material all occurs on one axis.

4 Claims, 5 Drawing Sheets

PLASTICATING AND INJECTION MOLDING SYSTEM

BACKGROUND OF THE INVENTION

1. Technical Field

This invention relates to plastic injection molding machines that process polymeric material using helical screws and extruders within heated or cooled cylinders and transferring the prepared homogenized polymeric material under pressure into injection molds to form articles for use in a variety of products and applications.

The manufacturing process of injection molding is a primary form of manufacturing of plastic products in the world today. The demands of high molded part tolerances, dimensional stability, and shot-to-shot repeatability are increasing and better controls and mechanical components of injection machines are required to meet the increasing demands. The primary design for injection molding machines today utilize what is referred to as "the reciprocating screw" process which is a 70-year-old process of feeding, melting, homogenizing, pumping and injecting polymeric material. There are four widely recognized deficiencies of the reciprocating screw injection molding process that lead to molded part variation; 1. Viscosity variations that are primarily caused by poor melt quality and homogenization, 2. Variation in the amount of polymer downstream of the Non Return Valve due to constant pressure flow changes, 3. Variation in the Quantity of Melt displaced due to inconsistent Non Return Valve closure, and 4. No accurate way to measure the mass density displacement that takes place, theretofore.

Accordingly, this invention relates to an improved injection molding system of melt preparation, division between the melting chamber and melt pool, accurate dispensing of the melt and the ability to measure the volumetric mass density that is injected into a mold.

2. Description of Prior Art

There are two primary widely recognized designs for a Thermoplastic Injection Molding Machine, a reciprocating screw and a two-stage screw and plunger design, the more conventional being the reciprocating screw process. Injection molding Reciprocating Screw (RS) units are well known in the art. For example, U.S. Pat. No. 2,629,132 to Willcox discloses an early RS injection unit, wherein a motor turns the screw to cause plastic pellets beneath the hopper to be conveyed towards a bore where melted plastic accumulates. The screw is then translated by a piston to push the melted plastic from the bore into the mold via the nozzle. The feed screw's shank (to the right of the flights) seals in the bore, thereby blocking off the hopper inlet. The feed screw is then retracted by the piston and is rotated during the retraction by the motor to cause plasticizing.

Two practical deficiencies arise from this disclosure. First, during the translation of the screw to inject the material into the mold, the leading end of the screw makes no seal with the inside surface of the bore until it has reached the end of its stroke when it seals with a bushing. Therefore, some of the melted plastic in the bore is able to flow backwards across the flights of the screw as it moves downstream during injection. This loss of plastic makes controlling the shot size unpredictable from cycle to cycle. Second, as the screw begins to be retracted and rotated, the hopper inlet continues to be blocked by the screw shank, so no new material can enter the screw flights. Indeed, the hopper inlet does not become unsealed until the screw is fully retracted (to the right). In fact, the retraction of the screw with the hopper inlet sealed will cause air to be drawn into the bore via the nozzle and gate opening (in the mold) after the most recent molded part has been removed. This ingested air must then be displaced by the next shot of plastic as it is prepared in the bore by the feeding action of the screw when rotating in its fully retracted position. This may result in the formation of bubbles of air in the next molded part unless this air is vented prior to the next injection stroke of the screw.

U.S. Pat. No. 2,734,226 to Willert discloses an RS injection unit that includes a shut off nozzle that allows melts to be accumulated between the screw tip and the barrel head, and a back pressure generated by restricting the venting of the oil from the injection pressure as the screw is pushed rearwards by the accumulating melted plastic in front of it. The patent also discloses continuous rotation of feed screw. Again, the leading end of the screw makes no seal with inside surface of the barrel bore, thereby allowing some melted resin to flow backwards as the screw is translated during its injection stroke. Not only is shot control affected, but also only moderate injection pressures can be achieved due to the absence of a sealing feature. Furthermore, because the screw does not pause at the end of recovery (plasticating), the injection stroke of the screw starts immediately, and control of the shot size is poor.

U.S. Pat. No. 2,885,734 to Wucher discloses an injection unit that has a Non-Return Valve disc attached to a diffuser head or screw tip that acts as a valve during the injection stroke, thereby inhibiting back flow of the material. This is an early example of a screw mounted non-return valve.

U.S. Pat. No. 3,002,229 to Friedrich discloses a die casting machine. A spring loaded shut off nozzle contains the melted material prior to injection. The screw does not translate but instead accumulates the melted material along the screw flights and in the space ahead of the screw where it is compressed while the shut off nozzle is closed. The patent discloses turning the screw continuously at two different speeds. A slow first speed is used for feeding and melting the material, and a higher second speed is used for injecting the material into the mold when the nozzle shut off is opened. Because the screw does not translate only a small shot size is prepared, and a relatively moderate injection pressure is generated since a non-return valve on the screw is absent.

U.S. Pat. No. 3,020,591 to Breher discloses an injection molding machine having a feeder worm screw with a ball check type non-return valve on the distal end and an accumulating chamber downstream of the screw. The patent also teaches that the feeder worm (screw) works uninterruptedly as it melts the plastic and feeds into the accumulating chamber. Injection of the melt is done by activating cylinders to cause the barrel head assembly to act like a piston inside the accumulating cylinder and displace its contents via the nozzle into the mold. The design has deficiencies relative to the current application whereas the ball check design requires movement of the barrel head to initiate shutoff and the injection piston lacks sufficient heating for the polymer leaving a significant surface area that is not heated.

U.S. Pat. No. 5,112,213 to Oas discloses an RS injection unit with a check ring style non-return valve designed so that by rotating the screw briefly in the opposite direction prior to injection causes the check ring to seal against the tapered seat thereby reducing the possibility of leakage.

An example of a two-stage screw and plunger design is seen in U.S. Pat. No. 4,722,679 to Farrell discloses an injection unit that includes an RS extruder supplemented by two piston cylinder arrangements, one for accumulating the melt and filling the mold and the second for providing packing and suck back operations. The screw is fitted with a check ring (non-return valve). The design provides a means to increase the shot size capacity of the unit without having to increase the size of the screw. The patent discloses that the screw recovery operation can begin as soon as the mold filling operation has been completed.

The state of art reciprocating screw process has major deficiencies as referenced above. Melt Quality is compromised during the injection phase of the operation of a conventional RS injection unit, whereas the non-rotating screw is advanced axially to inject the melt into the mold. As the flights of the screw pass under the open hopper feed throat, un-melted resin granules fall in between the flights, becoming available for plasticating when the screw resumes rotation. However, the pellets that are fed by gravity do not allow for a complete filling of the spaces defined between the flights, therefore only partial filling of the helical screw is achieved. This partial filling leads to a pause in the recovery time, and solids bed compaction issues. In addition, there is an uneven residence time, heat and shear history of the pellets as the screw reciprocates leaving an un-homogenous melt pool, the larger the shot the poorer the melt quality. Part weight precision is compromised because the conventional Non-Return Valve screw tip/shutoff that is connected to the distal end of the screw requires the movement of the screw to initiate shutoff which leads to inconsistent shutoff times and hence part weights. The present invention addresses these issues by exposing each pellet to the same residence time, heat and shear history for improved melting and homogenization, by providing a mechanically actuated shutoff mechanism for precise displacement of the polymer by using the kinetic energy of the Belleville springs or the like to initiate shutoff, and by separating the melting chamber from the melt pool for precise measurement of the melt density for accurate dispensing of the polymer.

SUMMARY OF THE INVENTION

The present invention utilizes a stationary (relative to the feed opening), non-reciprocating helical plasticating screw that is housed in an inner barrel that is connected to a plunger head, drive housing, and motor comprising an integrated unit that moves axially in unison within an outer barrel/pressure vessel during the injection process along one axis. The means for moving the assembly from the upstream end to the downstream end and into a mold is provided by conventional pneumatic, hydraulic or electric cylinders, ball-roller screws or other suitable method. By not allowing the helical screw to reciprocate relative to the fed port opening during the plasticating process, each plastic pellet or powder sees the same residence time, heat and shear history, regardless of the shot size which improves melt quality and homogenization as the screw acts like an extruder screw which is well known to those skilled in the art to be the preferred way to melt plastic pellets, this feature addresses deficiency #1 listed above. The plunger head that is connected to the distal end of the heating cylinder has a unique mechanically operated check valve-shutoff mechanism similar to the authors U.S. Pat. No. 8,734,146 B2 (that is in the normally closed position) opened when the screw is rotated pumping prepared molten polymeric fluid through the mechanism, downstream into the awaiting pressure vessel where the shot size is accumulated. The instantaneous closure of the plunger head when the screw stops turning assures that the melting chamber and the melt pool of the pressure vessel are distinctly separated, and assures that no backflow of material is allowed to enter the helical plasticating screw, this feature addresses deficiencies #2 and 3.

The outside diameter of the plunger head is fit in close proximity to the inside diameter of an outer barrel/pressure vessel in communication therewith so as to act like a cylinder head whose purpose is to form a seal while in the plasticating mode as well as the injection forward mode. The entire assembly is fitted with a nozzle tip for transfer of the molten polymeric material into a mold.

A direct drive motor is connected to the helical screw and is nestled to the drive housing that is free to reciprocate as a unit along a linear rail/guide system providing a more effective, inexpensive, and efficient method for melting and injecting molten polymeric fluid into an injection mold.

The design allows for a mass density sensor or the like to be added to the melt pool for determining the state of the melt in the pressure vessel and checking for volumetric mass density by adding a control feature to the system's program whereas the screw/plunger unit can be held in position while the screw continues to rotate to determine a more precise mass density with a compressible polymeric fluid. This feature cannot be utilized in a reciprocating screw design because the screw and pressure vessel are always connected by a single flow path which leads to constant pressure flow changes as described in deficiency #2 and 4 above.

DETAILED DESCRIPTION OF THE INVENTION

Figure 1:
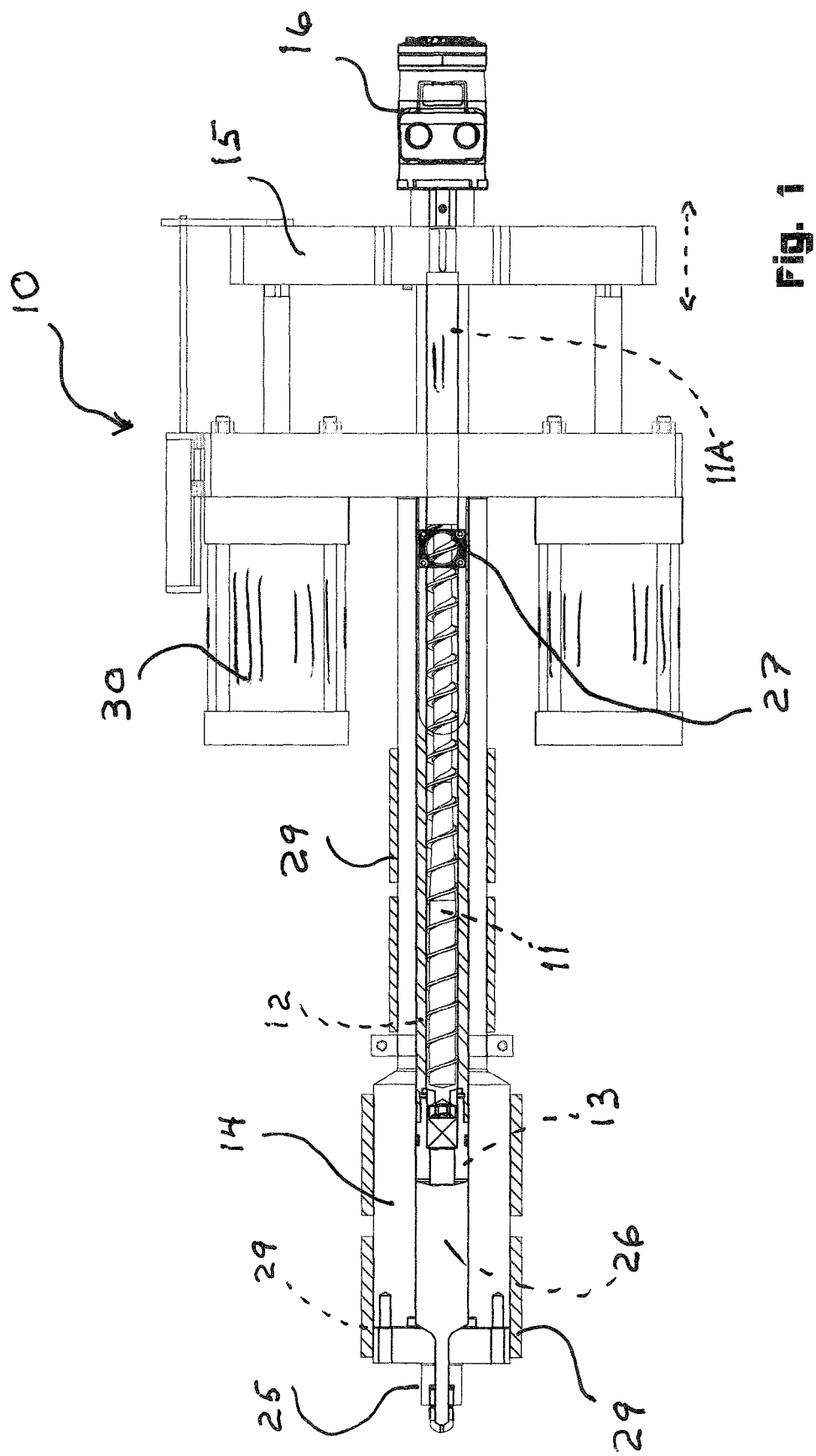
FIG. 1 is a top plan view of the injection molding device of the invention.
Figure 2:
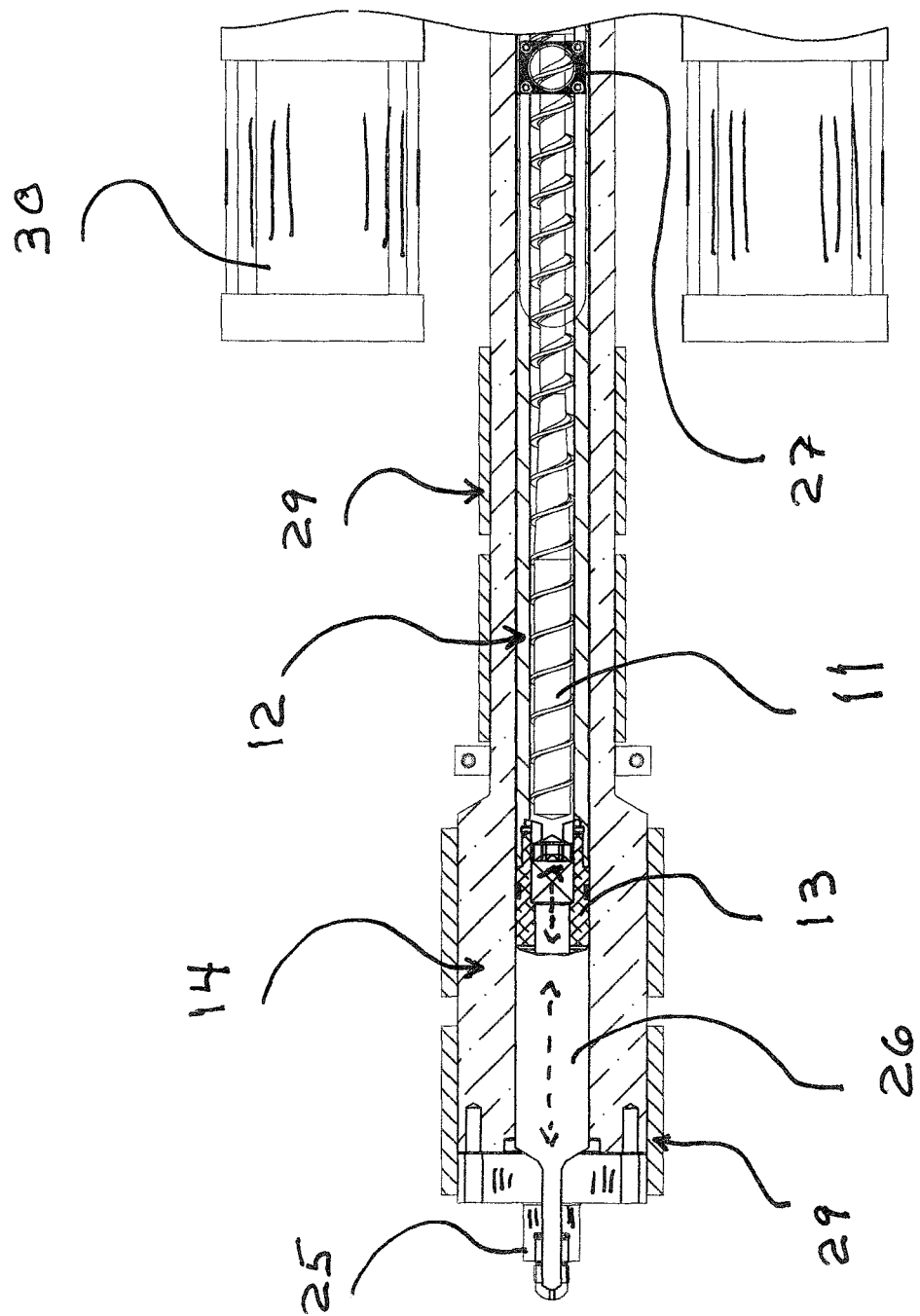
FIG. 2 is an enlarged partial top plan sectional view thereof.
Figure 3:
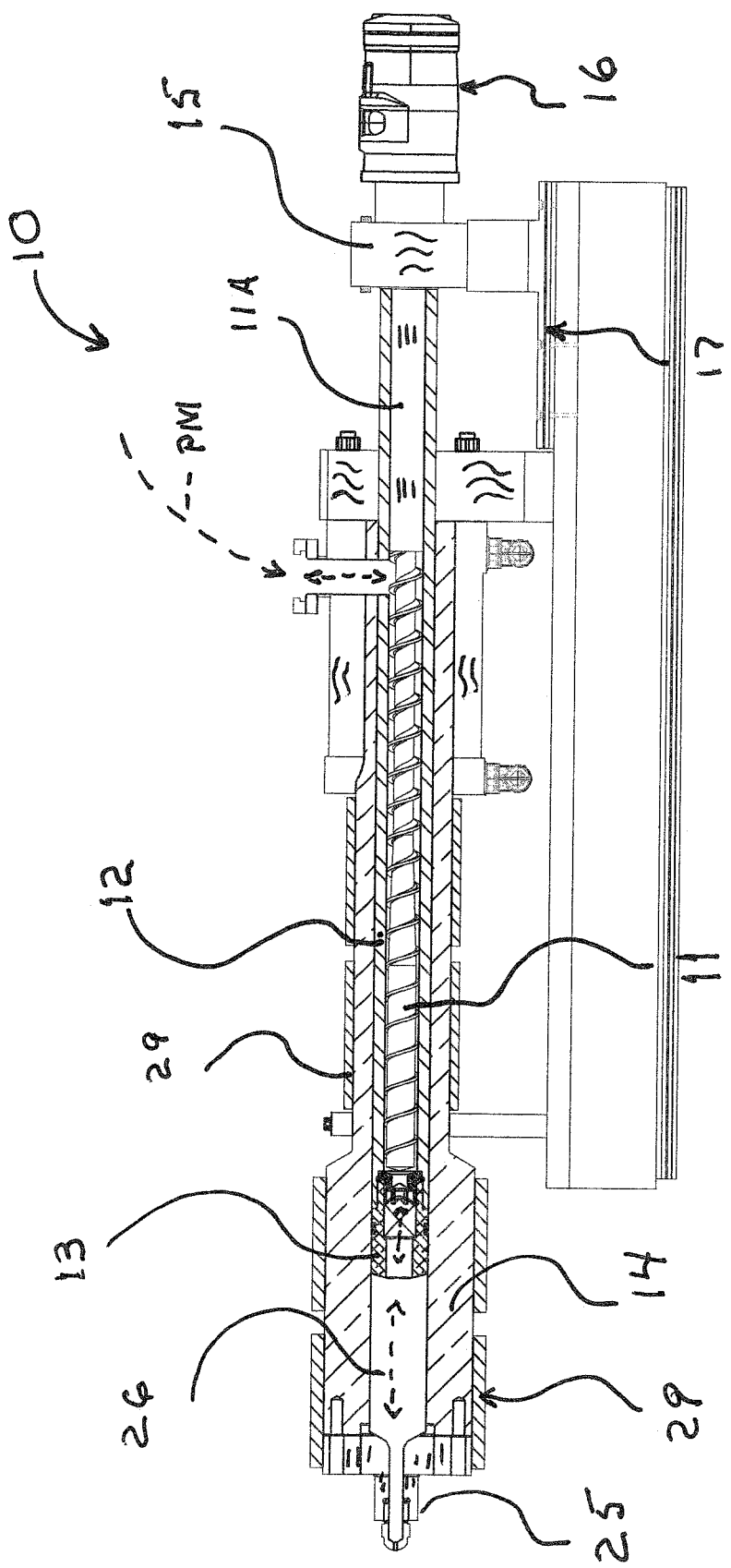
FIG. 3 is a side elevational view of the injection molding device of the invention.

Referring to FIGS. 1 and 3 of the drawings, a plasticating injection device 10 of the invention can be seen for an injection molding machine.

The plasticating device 10 includes a stationary non-reciprocal helical screw 11 that is housed within an inner barrel 12 whose purpose is to convey, melt, homogenize and pump polymeric material (PM) through a plunger head 13 that is mounted to an inner barrel 12 within a pressure vessel 14 displacing volume which thereby forces the helical screw 11, inner barrel 12, plunger head 13 and a drive housing 15 with motor 16 to retract in the upstream direction to a set stop position. The drive housing 15 rides on a linear rail system 17 or the like keeping the injection assembly defined by these elements on the same linear axis.

Figure 4:
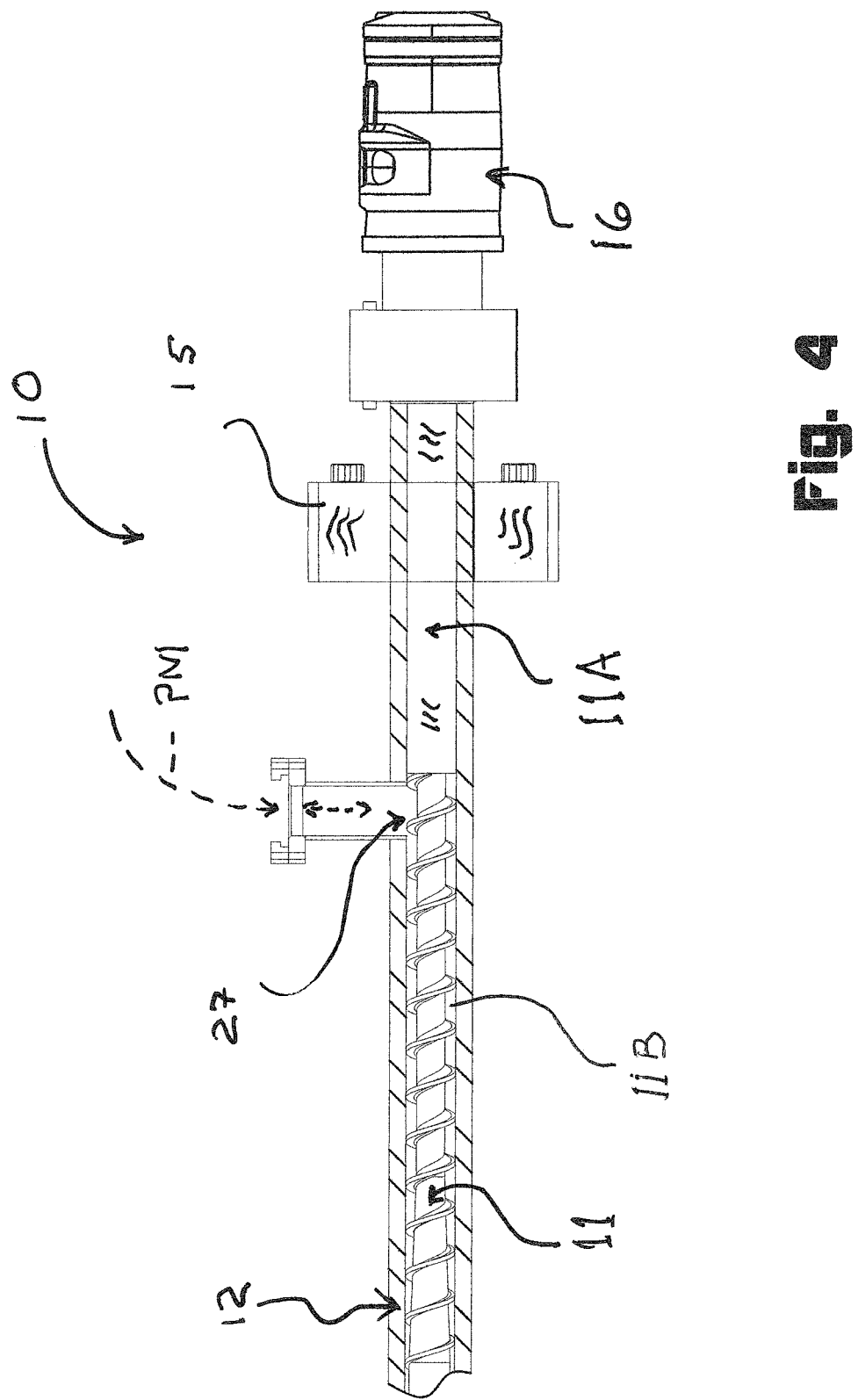
FIG. 4 is a partial side elevation view of the helical plasticating screw, inner barrel, screw drive motor, feed opening and plunger head of the invention.

As best seen in FIG. 4 of the drawings, the stationary non-reciprocating helical plasticating screw 11 within the inner barrel 12 can be seen with a plunger head 13 of the invention.

Figure 5:
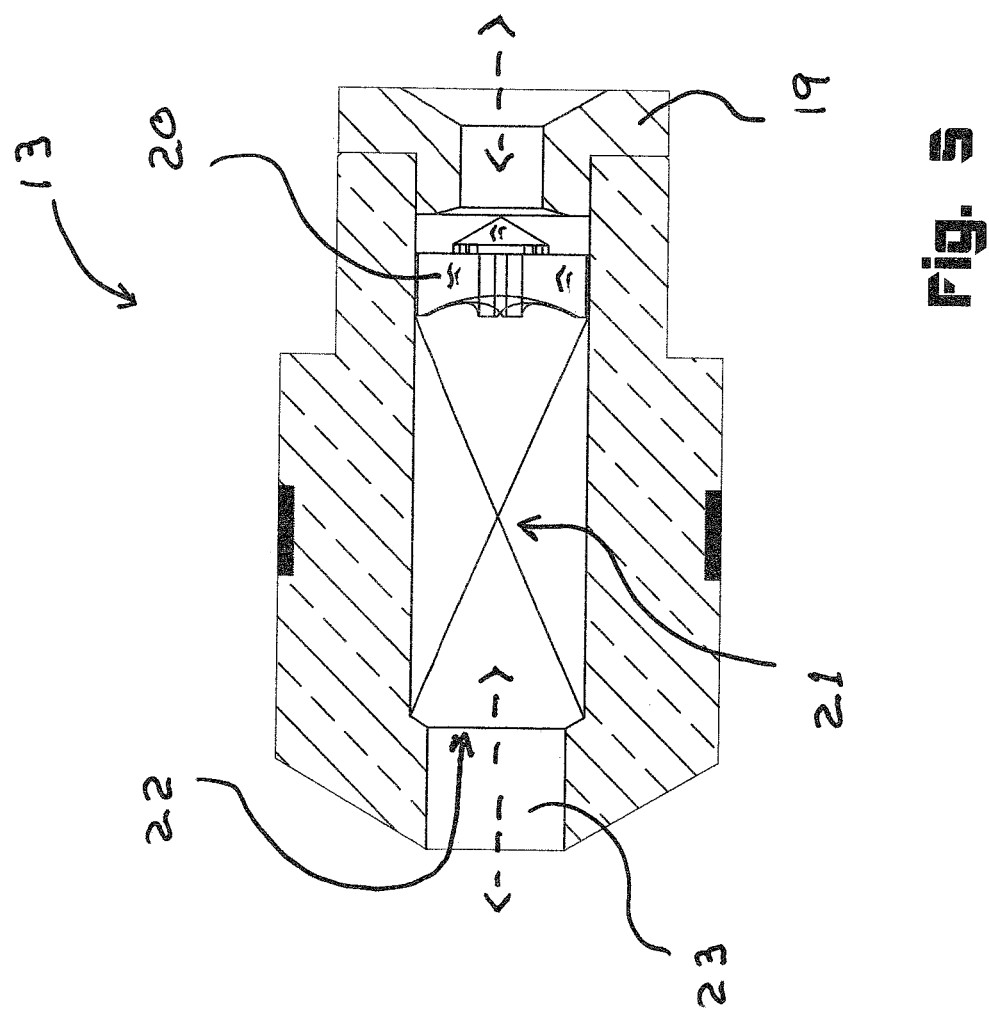
FIG. 5 is an enlarged side elevational view of the plunger head.

Referring now to FIG. 4-5 of the drawings, the plunger head 13 is illustrated in an open position depicting a seat 19 that forms a seal with a poppet valve 20 that is in normally closed position until the liquified polymer flow discharged from the helical screw 11 forces the poppet valve 20 off of its seat 19 creating a product flow opening and thereby urging springs 21 positioned within to deform while the liquid polymer, not shown, flows through the inside diameter of the springs 22 and through a now defined passageway orifice 23.

In operation, it will be seen that the plasticating injector device 10 of the invention utilizes the axially stationary non-reciprocating helical plasticating screw 11, feed opening 27, inner barrel 12, plunger head assembly 13, pressure vessel 14 and a nozzle body 25 with drive housing 15, motor 16, linear rail 17 guide, and external heater bands 29 that transfers heat into polymeric material that sits within the helical screw channel 11B which defines the injector assembly that will reciprocate as a unit to prepare molten/liquid polymetric material PM for subsequent injection through into an injection mold, not shown.

The helical screw 11 within the inner barrel 12 is coupled directly to the drive housing 15. The shank of the screw 11A has an attachment and is directly coupled to a screw drive motor 16 that provides the power to turn the screw 11 that conveys, melts, homogenizes and pumps molten liquid polymeric material PM forward and downstream along a flight channel 11B through the plunger head 13 and into the pressure vessel chamber 26, as noted. The plunger head 13 is directly coupled to the inner barrel 12 so as to become integral and by its nature opens and allows molten polymeric liquid material to flow downstream in one direction only and whose outside diameter is closely proximate with the inside diameter of a pressure vessel 14 forming a seal there between, as noted above. The helical plasticating screw 11 feed section extends beneath and forward from a material feed opening 27 where the polymeric material is to be processed and introduced and to be carried forward along the screw flight channel 11B inside the inner barrel 12 absorbing heat from said external heater bands 29.

The polymeric material is then worked and heated in the transition section so that melting of the polymer occurs as the material is moved forward along said screw flight channel 11B towards the passageway orifice Using an alternate liquid material, it is conveyed along the axis of the screw but is not heated. The polymer is passed through the transition section to reduce the root depth of the helical passageway to reflect the volume reduction due to the melting of the feed. The reduction of depth in the transition section also compresses the solid bed of pellets, liquid or powder. The transition section leads to a metering section, which has a shallow root depth helical passageway. The preferred geometry moving from the deep feed section to the shallow metering section takes the form of an involute taper geometry. The metering section has as its function the exertion of a constant flow rate pumping action on the molten polymer. In addition, any un-melted solids should be melted in the metering section as well as to mix the melted polymer homogenously. The molten/liquid polymeric material is forced into a center opening of the plunger head 13 that is mated to the inner barrel 12, through the plunger head and into a pressure vessel chamber 26 that is closed off, forcing the injection assembly to move backwards in the upstream direction, indicated by broken line arrow, along an alignment system while filling the pressure vessel 14 with molten/liquid polymeric material in the downstream direction. This process continues until the unitary injection assembly reaches a set axial stop position that in theory equals the mass necessary to fill the injection mold. However, since polymeric material is a compressible fluid there is no guarantee that the volume of material in the pressure vessel is enough to fill the mold so the injection device 10 may utilize a process with a change in programing whereas it will keep the injection assembly in a locked axial position and continue to rotate the screw 11 to build additional pressure until the proper volumetric mass density is reached, a feature that cannot be performed accurately with the reciprocating screw design. The measurement of the proper mass density may be determined by a direct exchange from sensors that are not shown, that detects melt density, then the screw 11 rotate phase will be stopped for preparation for the next injection forward phase of the cycle, the injection assembly is moved forward/downstream under power from hydraulic or electric or other mechanical source of the injection cylinder(s) 30, displacing the molten polymeric material through the nozzle body 25 and into a waiting vacant injection mold, not shown. The unitary movement of the injection assembly, improved homogenous melt preparation of the non-reciprocation stationary helical plasticating screw 11, precise, independent and instantaneous shutoff of the inside mechanism of the plunger head 13, determination of the mass of the compressible polymeric material with the addition of a mass density sensor which is not shown, exposed to the melt stream, precise seal between the plunger head 13 and pressure vessel 14 and a polymer that moves along one axis from feeding to injection into a mold makes up the improved injection molding process of this invention.

Therefore, I claim:

1. An injection process comprises:
   providing an injection assembly with a fixed position helical plasticating screw within a movable inner barrel, a screw feed port to accept polymeric material, liquid or powder material that is fixed to said movable inner barrel in a position complimentary to said helical plasticating screw feed port a plunger head assembly-attached to a free end of said movable inner barrel in spaced relation to a free end of said plasticating screw, a drive housing, a screw drive motor and injection cylinders forming an integral longitudinal reciprocating injection assembly with said helical plasticating screw, inner barrel and a said plunger head movable from a first upstream position to a second downstream position, a fixed outer cylindrical pressure vessel registerably receiving said plunger head, movable inner barrel, and said plasticating screw therein, means for closing said cylindrical pressure vessel downstream of said plunger head, heater bands placed on outer diameter of said fixed outer cylindrical pressure vessel for heat transfer to said movable inner barrel, said helical plasticating screw and said polymeric material that are movably positioned within said fixed outer cylindrical pressure vessel,
   receiving processible plastic material within said helical plasticating screw in said injection assembly for processing,
   transferring processed plastic material in fluid form from said helical plasticating screw through said plunger head into said fixed cylindrical pressure vessel forcing said injector assembly said helical plasticating screw and inner barrel to move upstream to a preset position determined by polymeric material mass displacement to fill an injection mold in communication with a nozzle body on said pressure vessel from an injector forward position, and;
   energizing injector cylinders on said injector assembly and said drive motor for said helical plasticating screw.

2. The injection process of claim 1 wherein said plunger head is movable from a first closed position to a second open position under processed plastic material flow there through from said helical plasticating screw by a shutoff means within said plunger head material flow path, whereas said plunger head is of a known outside diameter equal to that of said inner barrel outside diameter and to interior diameter of said fixed cylinder pressure vessel to form a seal therewithin for displacement of liquid processed plastic material from said fixed pressure vessel through said nozzle body to said injection mold.

3. The injector process of claim 1 wherein said processible plastic material is received into said reciprocal injector assembly via said screw feed port that is dependent on injector assembly reciprocal positions.

4. The injector process set forth in claim 1 wherein said helical plasticating screw, inner barrel and plunger head of said injector assembly is movable positioned entirely within said fixed outer cylindrical pressure vessel that serves as support and alignment for said inner barrel for heat transfer from said external heater bands to said inner barrel and helical screw for conductive heat to melt said polymeric material.

\* \* \* \* \*